(12) United States Patent
Potts

(10) Patent No.: US 10,837,164 B1
(45) Date of Patent: Nov. 17, 2020

(54) SUPPORTING OUTRIGGERS

(71) Applicant: David A. Potts, Lyme, CT (US)

(72) Inventor: David A. Potts, Lyme, CT (US)

(*) Notice: Subject to any disclaimer, the term of this patent is extended or adjusted under 35 U.S.C. 154(b) by 0 days.

(21) Appl. No.: 16/570,198

(22) Filed: Sep. 13, 2019

(51) Int. Cl.
    *E03F 1/00* (2006.01)
    *E02B 11/02* (2006.01)
    *C02F 1/00* (2006.01)

(52) U.S. Cl.
    CPC .............. *E03F 1/003* (2013.01); *C02F 1/001* (2013.01); *C02F 1/006* (2013.01); *C02F 2201/002* (2013.01)

(58) Field of Classification Search
    CPC .......... E03F 1/003; E03F 1/002; E02B 11/005
    See application file for complete search history.

(56) References Cited

U.S. PATENT DOCUMENTS

| | | | | |
|---|---|---|---|---|
| 3,793,845 A * | 2/1974 | Keith | ........................ | F16L 1/24 405/172 |
| 3,903,704 A * | 9/1975 | Spiridonov | ............. | F16L 1/201 405/229 |
| 3,993,192 A * | 11/1976 | Bunn | ................. | B65D 21/0233 206/515 |
| 4,171,174 A * | 10/1979 | Larsen | ...................... | E02B 3/04 405/157 |
| 4,338,045 A * | 7/1982 | Cour | ......................... | F16L 3/04 405/172 |
| 4,477,206 A * | 10/1984 | Papetti | .................... | F16L 1/123 405/172 |
| 4,913,588 A * | 4/1990 | Vilnes | ..................... | F16L 59/14 405/157 |
| 5,160,218 A * | 11/1992 | Hill | .......................... | F16L 1/24 405/157 |
| 5,385,430 A * | 1/1995 | Connors | ................. | E02D 27/38 405/157 |
| 5,785,454 A * | 7/1998 | Ringdal | .................. | E02B 13/00 405/45 |
| 6,461,078 B1 * | 10/2002 | Presby | ................... | B01D 29/23 138/105 |
| 7,189,027 B2 * | 3/2007 | Brochu | ................... | E03F 1/003 138/105 |
| 7,207,747 B1 * | 4/2007 | England | .................. | E01C 13/02 210/170.01 |
| 7,413,381 B1 * | 8/2008 | Bracone, Jr. | ............ | E03F 1/003 405/43 |
| 8,297,880 B2 * | 10/2012 | Brochu | ................... | E03F 1/003 405/49 |
| 8,702,347 B2 * | 4/2014 | Manimala | ................. | E02D 5/60 405/157 |

(Continued)

*Primary Examiner* — Benjamin F Fiorello
(74) *Attorney, Agent, or Firm* — Grasso PLLC

(57) ABSTRACT

Embodiments may be directed to processes, devices, systems, and manufactures involving water leaching systems. Embodiments may comprise one or more receiving chambers and a plurality of outriggers connected to one or more receiving chambers in such a way as to provide support against external loads acting on the one or more receiving chambers. The outriggers may be directly coupled with chambers and may be spaced apart from chambers as well. The outriggers may also be integrated with the chambers and may be added to or detachable from the chambers. The outriggers along with the chambers may each provide for leaching of wastewater or other water from them along one or more of their sides.

22 Claims, 11 Drawing Sheets

(56) References Cited

U.S. PATENT DOCUMENTS

| | | | | |
|---|---|---|---|---|
| 8,777,515 B1* | 7/2014 | Donlin | ............ | E02B 11/005 |
| | | | | 405/45 |
| D711,210 S * | 8/2014 | Gentry | ............ | D8/349 |
| 8,864,414 B1* | 10/2014 | Webb | ............ | F16L 1/06 |
| | | | | 405/157 |
| 9,045,873 B1* | 6/2015 | Moore, Jr. | ............ | E03F 1/003 |
| 9,290,924 B2* | 3/2016 | Wynne | ............ | E03F 1/003 |
| 9,580,898 B2* | 2/2017 | Wynne | ............ | E03F 1/002 |
| 9,809,941 B1* | 11/2017 | Donlin | ............ | E03F 1/002 |
| 2003/0161685 A1* | 8/2003 | Vasseur | ............ | E03F 1/003 |
| | | | | 405/36 |
| 2004/0101369 A1* | 5/2004 | DiTullio | ............ | E03F 1/003 |
| | | | | 405/49 |
| 2004/0265068 A1* | 12/2004 | Guedes De Melo | ..... | F16L 1/06 |
| | | | | 405/184.4 |
| 2006/0182497 A1* | 8/2006 | Potts | ............ | E03F 1/002 |
| | | | | 405/46 |
| 2006/0272988 A1* | 12/2006 | Potts | ............ | B09C 1/002 |
| | | | | 210/170.01 |
| 2013/0058721 A1* | 3/2013 | Koerner | ............ | E02B 13/00 |
| | | | | 405/42 |
| 2013/0216310 A1* | 8/2013 | Bass | ............ | B09B 1/004 |
| | | | | 405/80 |
| 2014/0212219 A1* | 7/2014 | Jowett | ............ | B21B 1/38 |
| | | | | 405/36 |
| 2016/0097175 A1* | 4/2016 | Parker | ............ | F16L 1/036 |
| | | | | 405/184.4 |

\* cited by examiner

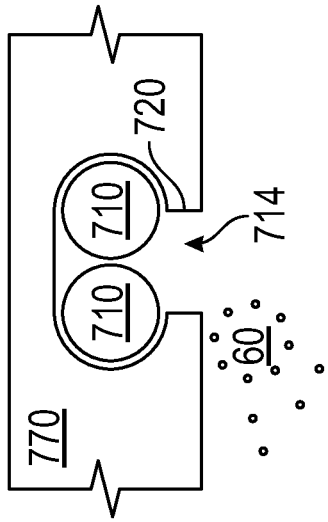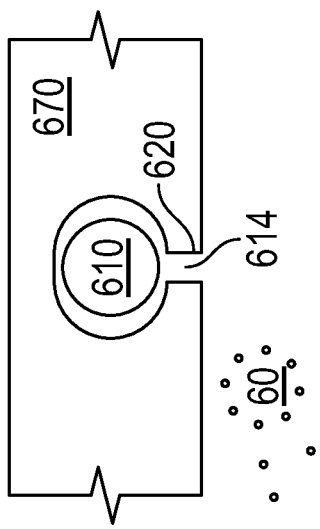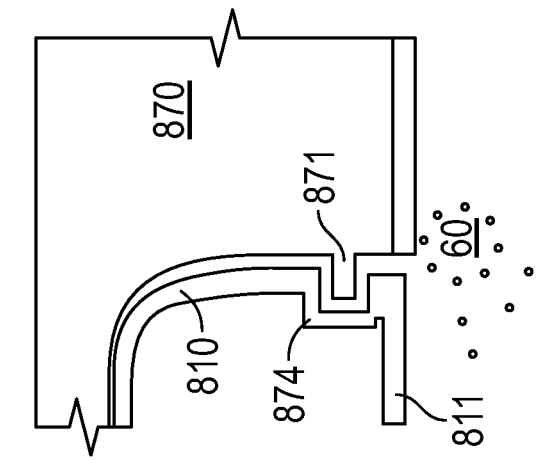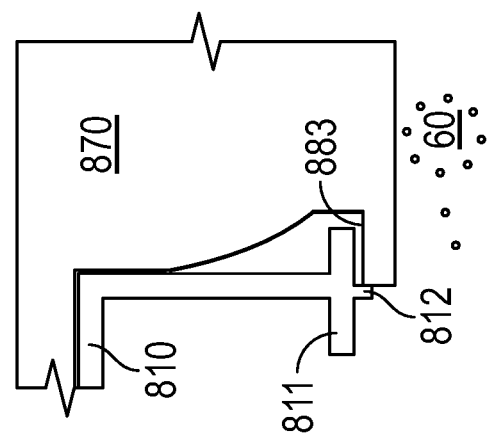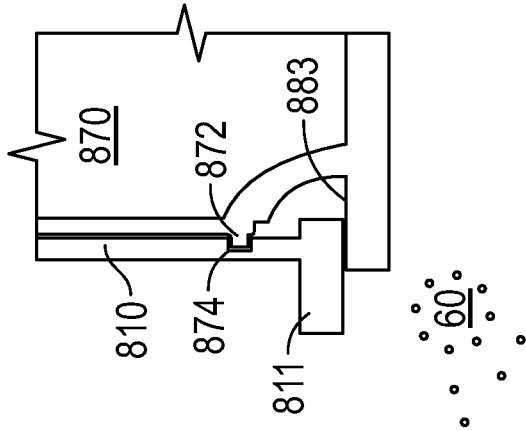

SUPPORTING OUTRIGGERS

TECHNICAL FIELD

Processes, systems, devices, and articles of manufacture regarding external loading support of residential, commercial, or industrial water leaching systems are provided herein. More particularly, water leaching systems with supporting outriggers, where the supporting outriggers provide support from external loads received by other portions of the water leaching systems, are provided herein.

BACKGROUND

Water, e.g., wastewater, process water, or stormwater, leaching systems ("water leaching systems") vary in size and scope. They can be sized for processing large amounts of water from a municipality or other large cumulative systems for benefitting many residences, businesses, and industrial facilities serviced by the municipality. Water leaching systems can also be designed and sized for single home residential use and for small-scale residential and commercial uses. Water leaching systems can comprise components that are fluidly connected together at an infiltration site to form the water leaching system, such as a wastewater leaching system or a process water leaching system. When installed, these water leaching systems may receive external structural loading from overburden soil, activity above overburden soil, vehicle loads, and from other sources as well.

BRIEF DESCRIPTION OF THE SEVERAL VIEWS OF THE DRAWINGS

FIG. 6 shows a partial end view of a leaching module with outriggers and one receiving chamber as may be employed in embodiments.

FIG. 7 shows a partial end view of a leaching module with outriggers and two receiving chambers as may be employed in embodiments.

FIG. 8A shows a partial sectional view of a leaching module with outrigger connection detail as may be employed in embodiments.

FIG. 8B shows a partial sectional view of a leaching module with outrigger connection detail as may be employed in embodiments.

FIG. 8C shows a partial sectional view of a leaching module with outrigger connection detail as may be employed in embodiments.

DETAILED DESCRIPTION

Figure 1A:
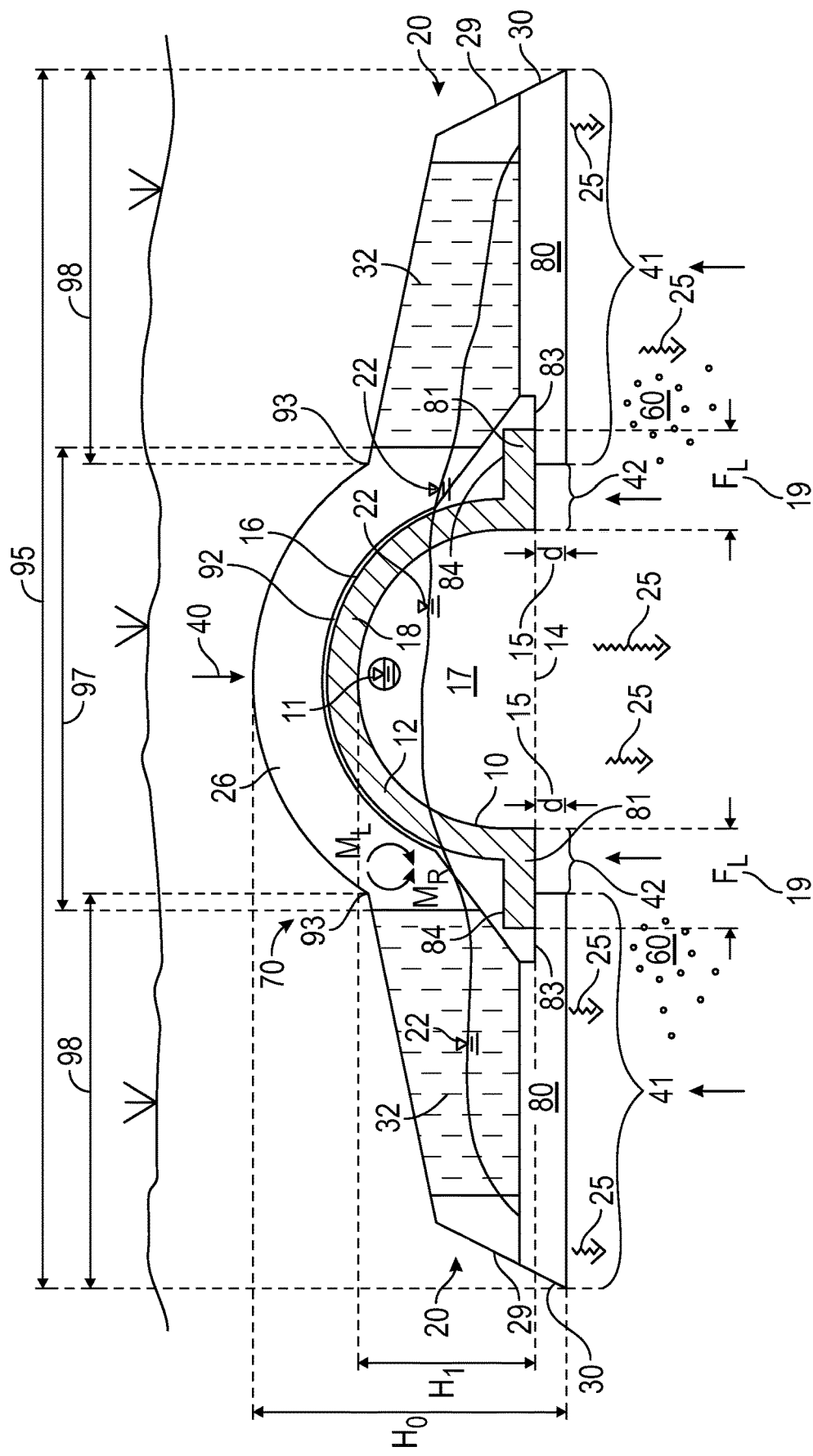
FIG. 1A shows a partial cross-sectional elevational view of a leaching module with non-integral outriggers as may be employed in embodiments.

Embodiments may be directed to processes, devices, systems, and manufactures involving water, e.g., wastewater, process water, and stormwater, etc., leaching systems ("water leaching systems"). Embodiments may comprise one or more receiving chambers and a plurality of outriggers structurally connected to one or more receiving chambers in such a way as to provide structural support against external loads acting on the one or more receiving chambers. The outriggers may be directly coupled with receiving chambers and may be spaced apart from receiving chambers as well. The outriggers may also be integrated with the receiving chambers or may be added to or detachable from the receiving chambers. The outriggers and the receiving chamber(s) are preferably fluidly connected such that water received by the receiving chamber may be diverted to the outriggers as well. Either or both of the outriggers and the receiving chambers may provide for leaching of wastewater or other water from them along one or more of their sides as well as any open bottom that may be present in some embodiments. These sides may be upright sides as well as top and bottom sides. The upright sides may be vertical, somewhat vertical as well as other angles, e.g., from approximately −89° to 89° from a vertical position. As noted, the receiving chambers and the outriggers may have open or closed bottoms. Closed bottoms may or may not have penetrations that allow water to flow and infiltrate therethrough.

In embodiments, the outriggers may be connected to one or more receiving chambers in such a way as to carry a portion or all of an external load acting on one or more receiving chambers. For example, a normal load acting above a buried central receiving chamber or other receiving chamber of a leaching system may be received by and carried by buried outriggers adjacent to the buried central receiving chamber or other receiving chamber. In so doing, a central receiving chamber, off-center receiving chamber, or other receiving chamber may not settle or may settle less, may not deflect or may deflect less, etc. when a normal, i.e., perpendicular, load or other external downward load is placed above the central receiving chamber or other receiving chamber, as compared to a central receiving chamber or other receiving chamber not associated with one or more outriggers.

Outriggers may be used with central receiving chambers, with leaching receiving chambers, and/or with other receiving chambers. In embodiments, outriggers may have a single fin, two fins, three fins, or more. Fin pairs of outriggers may lie along a shared plane of reference, may be on opposite sides of a receiving chamber, may be on the same side of a receiving chamber, and may also be offset from each other. Thus, sets of outrigger fins may lie along one side of a receiving chamber as well as along opposite sides of a receiving chamber. In embodiments, outriggers, can comprise a fin with a connector or other structural component to align and secure the fin relative to one or more receiving chambers. Thus, outriggers may have one fin, two fins, three fins, or more. The fins of these outriggers may have no infiltrative surfaces or may have one or more infiltrative surfaces. The outrigger may be fluidly connected to the receiving chamber with open spaces, passages, infiltrative surfaces, tubes, and numerous other configurations that can allow water to flow from the receiving chamber to the fin or fins. In some embodiments, an outrigger may not be fluidly connected to the receiving chamber. The outriggers may be spaced apart from the receiving chambers in certain portions and may be mated with the receiving chambers in certain portions.

Integral connections between an outrigger and a receiving chamber may have no separation between the outrigger and the receiving chamber, may have connecting portions that are permanently connected after being attached to each other, may be manufactured or connected with separations, or combinations(s) thereof. An integrally connected outrigger and receiving chamber may be manufactured as one piece, or may be permanently connected after each piece is manufactured. Non-integrally connected outriggers and receiving chambers may have a separation between an outrigger and a receiving chamber, may be connected with attachment mechanisms also designed to allow the connection to be repeatedly undone and reconnected without destruction, or may be connected with a space therebetween. In embodiments, an outrigger and a receiving chamber may have both integral and non-integral connections. In embodiments, whether integral or non-integral the connections may be configured to allow external surface loads to be transferred, in majority, to the outrigger and its fins. Thus, an external load applied directly atop a receiving chamber and outrigger may be transferred by approximately 15%, 25%, 30%, 35%, 40%, 45%, 50%, 60%, 70%, 80%, 90%, or 100% to the outrigger fins while the remaining load is carried by the receiving chamber. In other structural loading conditions, for example, when loads are not atop the receiving chamber, these loads, too, may be carried, in the majority or by approximately 15%, 25%, 30%, 35%, 40%, 45%, 50%, 60%, 70%, 80%, 90%, or 100%, by the one or more outrigger coupled to the receiving chamber or chambers.

In embodiments, receiving chambers may be associated with outriggers during manufacture or upon installation. As well, existing manufactured and/or installed receiving chambers may be retrofitted with outriggers in embodiments. The outriggers may span across the receiving chambers or may be connected to the receiving chambers, or both, in embodiments. The outriggers and the receiving chambers may each have foundations located on them for interacting with surrounding treatment media or other material, and for providing foundational support. The foundations and their foundational surfaces may be located along bottom surfaces of the outriggers or receiving chambers as well as at other locations. For example, foundations and their foundational surfaces may be located at the bottom and midway points of upright infiltrative surfaces of outriggers. The foundations and their foundational surfaces may extend outwardly from the infiltrative surfaces and may be parallel or approximately parallel with other foundations and their foundational surfaces. The foundations and their foundational surfaces may be connected to the outriggers such that reactive forces can be relayed from the foundations and distributed through the outriggers and away from the receiving chambers.

In embodiments, the receiving chambers and the outriggers may each comprise polymer, polymers, combinations of polymers and non-polymers, as well as other materials, or combination(s) thereof. The other materials may comprise, for example, metals, concrete, and/or ceramics. The receiving chambers and the outriggers may be formed as a unit during manufacture or may be manufactured apart and later assembled together as a unit during manufacture, at a job-site or at other times as well. Still further, the outriggers or other components may be retro-fitted onto an existing receiving chamber. This existing receiving chamber may be installed or may not already be installed when mated with one or more outriggers. Outriggers may comprise a span and a pair of fins. Other configurations, such as a span or partial span and one fin, or a span and three, four, five, etc. fins are also contemplated. The spans and fins may be of various shapes and sizes. For example, the span may comprise an arch, a pointed arch, a trapezoid, a flat surface, and other shapes, as well. As well as being manufactured integrally with receiving chambers, outriggers may be manufactured separately from receiving chambers. Outriggers may be manufactured in various suitable portions, such as: fins separate from spans; fins integral with partial spans, such as half spans; where fin pairs are desired, complete integral fin-span-fin apparatuses; and other combinations, such as spans with more than two fins, as well. Non-integrally manufactured outriggers may be assembled before or after transportation to a job site, and before or during installation. Portions of outriggers may be unconnected or may be connected together permanently or detachably. Connections such as those described for connecting outriggers to receiving chambers may be used (e.g., adhesives, cement, mechanical fasteners, other securement techniques, or combination(s) thereof). Preferably, the connections may be manufactured and configured to withstand forces as described herein, transfer forces between portions of the outrigger, transfer forces from the receiving chamber to the outrigger, and transfer reactive forces, without undergoing plastic deformation, unintentional detachment, permanent deformation, or otherwise being changed or changing in shape or appearance, such that the structure is no longer able to structurally support approximately 90% or more of its design loading.

Outriggers of embodiments may provide reactive forces, including shear forces, torsional forces, and reactive moments, in order to oppose external loads placed on them or on a nearby receiving chamber(s) or external loads placed on both them and the receiving chamber(s). The outrigger reactive forces may be large enough to reduce or eliminate receiving chamber(s) reactive forces necessary for one or more receiving chamber(s) to provide in response to loads imposed on the receiving chamber(s). For example, outriggers may carry a portion, e.g., approximately one-third, one-half, three-quarters, or other portion of the load placed on one or more receiving chamber in order to reduce the loading on the receiving chamber(s) and any associated deformation and/or settlement or displacement. Moreover, by carrying a portion or all of a load placed on a receiving chamber, the use of an outrigger or pair(s) or grouping(s) of outriggers can reduce the need for other structural reinforcements of a receiving chamber or grouping of receiving chambers. Similarly, outriggers can reduce deflection or other deformation of a receiving chamber caused by external loading on the receiving chamber. In so doing, previously inadequate receiving chamber designs, whether already installed, already in use, under design, previously manufactured, etc., may be more suited for external loading when also supported by outriggers. As noted above, these outriggers may be added during manufacture as well as after manufacture, either before, during, or after initial installation of the receiving chamber(s). The outriggers may even be added as a retro-fit solution for already assembled and/or installed receiving chamber(s).

In embodiments, the outriggers may be configured in various ways and may extend from the receiving chamber or chambers in various ways. In embodiments, the outriggers and the receiving chambers may contain one or more infiltrative sides. These infiltrative sides may be located on top, bottom, sides, combinations of these surfaces, and portions of them. The outriggers and the receiving chambers may be formed from a homogenous or heterogenous polymer material and may also comprise different materials, such as combinations of polymers and non-polymers, metals, concrete, and/or ceramics. The attachment between the outriggers and the receiving chambers may be suitable to transfer torsional or other torque loads as well as shear loads, compression loads, tension loads, and other loads. The attachment mechanism may comprise tabs, lips, anchors, or combination(s) thereof positioned and located to promote securement between the outriggers and the receiving chambers as well as to promote load transfer about and between the receiving chambers and the outriggers. Other attachment mechanisms, including pins, rivets, snaps, or combination(s) thereof, may also be employed. Moreover, attachment mechanisms may comprise male/female groupings, detachable connectors, keyed connectors, alignment connectors, deformable connectors, re-attachable connectors, or combination(s) thereof.

There are various adaptations of embodiments, and many permutations, that may be employed within the spirit and scope of this disclosure. Those of skill will understand that the invention is not to be limited to only those embodiments described herein and that other embodiments and applications consistent with the teachings herein would also fall with the scope of this disclosure. For example, and as explained in more detail herein, these other permutations can include variations in components of the receiving chambers, the infiltration fields, the infiltration sides, the outriggers, any surrounding Infiltration Treatment Media (ITM), the connections between the chambers and the outriggers, as well as still other permutations of these and other components.

Embodiments may be directed to processes, devices, and manufactures in which a water leaching system, such as a wastewater leaching system, may comprise a receiving chamber made of, e.g., polymer, and having a length, an upper arched portion, a lower portion, a wastewater or other water receiving area aligned along the length, an internal height, and an outer wall having an externally facing outer surface; and a plurality of outriggers. Also, at least a majority of the outriggers of the plurality may extend a distance away from the externally facing outer surface, and the distance preferably may be equal to or greater than approximately one-half the internal height of the receiving chamber, and at least a majority of the outriggers of the plurality may be in fluid communication with a wastewater or other water receiving area of the receiving chamber. Still further, in some embodiments at least a majority of the outriggers of the plurality may be configured to receive wastewater or other water that has flowed within the receiving chamber and along the length of the receiving chamber, and at least a majority of the outriggers of the plurality may have at least one infiltrative surface, the infiltrative surface configured to infiltrate wastewater or other water within the outrigger to a treatment media located outside of the outrigger. In embodiments, and the receiving chamber may have a weight, and the plurality of outriggers may have a cumulative weight, and preferably neither of the receiving chamber weight nor the cumulative weight of the plurality of outriggers may be greater than approximately four times the other. In some embodiments, the receiving chamber may be a polymer circular pipe and more specifically a corrugated polymer circular pipe. In some embodiments, each of the outriggers of the plurality of outriggers may be fluidly connected to the receiving chamber and/or pairs of the outriggers of the plurality of outriggers may span over the upper, e.g., arched, portion of the receiving chamber and extend outwardly from the receiving chamber in different directions. Still further, in some embodiments, the lower portion of the receiving chamber may have a leaching interface and the leaching interface may be an open bottom, a filter fabric, a side with slots or penetrations, or other voids allowing a fluid to pass therethrough. Each one of these variations of leaching interfaces may be employed by one, two, three, four, a minority, or a majority of receiving chamber surfaces, as well as one or more sides of one or more of the plurality of outriggers.

Embodiments may also comprise a receiving chamber, which may comprise a polymer, having an outer wall, a chamber foundation surface, an external height, a length, and an internal wastewater or other water receiving area aligned longitudinally along the length; and a plurality of outrigger leaching fins; each of the outrigger leaching fins may have a height to width aspect ratio of approximately three or more and ninety-six or less, and each of the outrigger leaching fins may have at least one: infiltrative surface, fin foundation surface, and may extend from the outer wall of the receiving chamber a distance at least approximately half of the external height of the receiving chamber. Still further, in embodiments, one or more, such as each, of the outrigger leaching fins may be fluidly connected to one or more internal wastewater or other water receiving areas of a receiving chamber, and one or more, such as each, of the outrigger leaching fins may be connected to the receiving chamber via a structural connection, where the structural connection may be configured to transfer a moment or shear force or other force through the structural connection without structural failure. In some embodiments, the structural connection may be configured to transfer a moment or shear force or other force developed in the structural connection without structural failure of the connection when a live load placed above the receiving chamber is at least approximately 13.8 pounds per square inch. Other live loading limits may also be employed in embodiments.

These limits may be higher or lower and may include PSI loading in a range of approximately 1-30 or higher. The increments in this range may increment in approximately 0.1, 0.25, and 0.5 PSI steps, e.g., 1.1, 1.25, 1.5 . . . 3.25, 3.5 . . . 29.1, 29.25, 29.5, etc. Structural connections may also be manufactured and configured to resist unintentional detachment. And, in some embodiments, the receiving chamber foundation surface and the outrigger leaching fin foundation surfaces may each have a perimeter ledge. The ledges may interface with each other and serve to transfer loads between the receiving chamber and the outrigger. In embodiments, the interface may be coupled or noncoupled. A coupled interface can be secured with adhesives, cement, mechanical fasteners, other securement techniques, or combination(s) thereof. A coupled interface may be better suited to transfer shear and moment loads among and between the coupled features. An uncoupled interface would not be secured with fasteners or adhesives and would allow for slipping between the uncoupled interfacing structures. Such a connection may transfer shear forces but may only transfer minimal moment forces, which may be small enough to transfer through the frictional forces serving to retard slipping between the uncoupled interface.

A material may be considered to have structurally failed when the material is plastically deformed and is no longer able to support approximately 90% of its design loading before plastic deformation. A structure may be considered to have structurally failed, when, after external loading, the structure has permanently deformed, moved, cracked, split, or otherwise changed in shape or appearance and the structure is no longer able to support approximately 90% of its design loading. Permanent strain results in the material being permanently deformed and may be considered structural failure when the deformation also includes the material no longer being able to support approximately 90% of its design loading.

In some embodiments, the plurality of outrigger leaching fins may be arranged in a plurality of pairs, and a majority of outrigger leaching fins of the plurality of pairs of outrigger leaching fins may have a closed or partially closed bottom surface; one or more, such as each, of the outrigger leaching fins of the plurality of outrigger leaching fins may be attached to one or more receiving chamber via a tab(s), lip(s), anchor(s), other securement means, or combination(s) thereof coupled to the receiving chamber foundation surface and wherein the receiving chamber comprises a pipe, such as a polymer pipe; the outrigger leaching fin foundation surface of each of the outrigger leaching fins may have an outwardly facing edge; and each of the outrigger leaching fins may include a bottom infiltrative surface.

Embodiments may also comprise a wastewater or other water leaching system with a plurality of pairs of outrigger leaching fins, where each outrigger leaching fin may comprise an external foundation and an infiltrative surface. Such a system, in embodiments, may also have a receiving chamber in fluid communication with each outrigger fin, the receiving chamber may have an external foundation, and a first internal height, and a hollow, where the hollow may extend along an internal length of the receiving chamber. Still further, a first outrigger leaching fin of a first pair of outrigger leaching fins may extend outwardly from the receiving chamber in a first direction and a second outrigger leaching fin of the first pair of outrigger leaching fins may extend outwardly from the receiving chamber in a second direction, the second direction approximately opposite the first direction, and a first outrigger leaching fin of a second pair of outrigger leaching fins may extend outwardly from the receiving chamber in a first direction and a second outrigger leaching fin of the second pair of outrigger leaching fins may extend outwardly from the receiving chamber in a second direction, the second direction approximately opposite the first direction. In other words, a receiving chamber may be connected to or supported by more than one pair of outrigger leaching fins. Also, in embodiments, a first pair of outrigger leaching fins and, optionally, a second pair of outrigger leaching fins may be structurally connected to the receiving chamber, the structural connection may be configured to transfer a portion of the weight of the receiving chamber to the pair or pairs of outrigger leaching fins for that transferred weight to be carried by the pair or pairs of outrigger leaching fins.

In some embodiments, one or more pairs of the plurality of pairs of the outrigger leaching fins may be configured to provide supporting reactive forces opposing normal compressive forces received by the receiving chamber, likewise, the plurality of pairs of outrigger fins may carry a portion of a normal load acting on the receiving chamber. In some embodiments, an external height of at least one outrigger leaching fin of the plurality of pairs of outrigger leaching fins may be higher than any perforation on the receiving chamber and/or a majority of the outrigger fins from the plurality of pairs of outrigger leaching fins may extend beyond the external foundation of the receiving chamber. Still further, in some embodiments, the outrigger leaching fins and receiving chamber may comprise the same material and this material may be homogeneous or heterogeneous polymer, ceramic, metal, concrete, and combinations thereof. When made of polymer or other flowable material, the outrigger leaching fins and receiving chamber may comprise injection molded material.

Some embodiments may comprise a wastewater or other water leaching system with one or more of the following: a receiving chamber, such as a polymer leaching receiving chamber, having an outer wall, a chamber foundation surface, an external height, a length, and an internal wastewater or other water receiving area aligned longitudinally along the length; and a plurality of outrigger leaching fins, where each of the outrigger leaching fins may have a height to width aspect ratio of approximately three or more and ninety-six or less, an infiltrative surface, a fin foundation surface, and each of the outrigger leaching fins may extend from the outer wall of the receiving chamber a distance at least approximately half of the external height of the receiving chamber. Also, in some embodiments, each of the outrigger leaching fins may be fluidly connected to the internal wastewater or other water receiving area, and each of the outrigger leaching fins may be connected to the receiving chamber via a structural connection, and the structural connection may be configured to transfer a moment or shear force or other force from the receiving chamber to the outrigger leaching fins, wherein the transferred moment may be carried by the receiving outrigger leaching fin. Also, in some embodiments, the receiving chamber foundation surface and the outrigger leaching fin foundation surfaces may each have a perimeter ledge. These perimeter ledges and foundational surfaces may be located at different invert elevations. Because of these different invert elevations, the outrigger or outriggers may be better suited to carry some or all of the load positioned atop the receiving chamber. In some embodiments, by having the foundational surfaces at different invert elevations, a central receiving chamber may receive little if any reactive forces as the majority of the reactive forces may be received by the foundation of the outrigger fins and carried by the outrigger(s).

Further, in some embodiments, outriggers or outrigger fins may not comprise or be leaching fins and may not be in fluid connection with a receiving chamber. In such embodiments, the outriggers or outrigger fins may have a structural connection to the receiving chamber and provide structural support to the receiving chamber. Other than the fluid connection, the dimensions and other characteristics of such non-leaching outriggers or outrigger fins may be as described herein. Such embodiments may be particularly useful when installing outriggers or outrigger fins on receiving chambers that are not configured for fluid connection with outriggers or outrigger fins, such as previously-installed receiving chambers.

In embodiments, a wastewater leaching system leaching field or other leaching field of an infiltration system may be constructed in phases through the use of modules. These modules may comprise a receiving chamber and one or more outriggers. In embodiments, the leaching modules may be connected in series, in parallel, or in combinations of series and parallel. They may be connected with one or more valves and may be vented as well. Infiltration treatment media (ITM) may be placed between the outriggers as well as around, below, and above the installed modules. This ITM may be placed during the installation of the wastewater or other water leaching system. The modules may be constructed offsite and brought to an installation site in a retracted, or collapsed, condition. Then, ahead of, or during installation, the modules may be reconfigured into their extended positions and installed as a wastewater or other water leaching system or other infiltration field.

Various designs and materials may be employed in embodiments. PVC pipe or other pipe material may be employed as a support and/or dosing distribution conduit. Spacers may be used with the modules to maintain a preferred channel height. These spacers may be positioned below foundational surfaces and may maintain a minimum invert elevation of a wastewater or other water leaching system.

In embodiments, a fabric, membrane, other outer material, or combination(s) thereof may be placed around or with the receiving chambers, the outrigger fins, the outriggers and any infiltrative surfaces present in embodiments. In embodiments, one or more infiltrative surfaces may be hygroscopic or hygroscopically treated. This outer material may encase the entire wastewater or other water leaching module or may encase only portions of it.

In embodiments, the outrigger fins may have parallel side cross-sectional profiles, nonparallel side cross-sectional profiles, a triangular cross-sectional profile or other cross-sectional profiles. Other orientations are also possible in embodiments.

Outrigger fins of embodiments may be typically spaced approximately 4" to 6" apart from each other, and the space between them may be filled with soil, such as: sand, etc. and/or other suitable treatment media. Outrigger fins in embodiments may have a height to width aspect ratio of approximately 3-96, e.g., the median cross-sectional height of an outrigger fin may be approximately three times the median cross-sectional width of the outrigger fin, and the median cross-sectional height of an outrigger fin may be approximately ninety-six times the median cross-sectional width of the outrigger fin, but other aspect ratios within this range and outside of this range may also be employed.

Wastewater or other water leaching systems of embodiments may comprise both external materials and internal materials. The internal materials and external materials may include stringy structures, three-dimensional plastic matrixes, geotextile fabric or other geotextile materials obtained from various manufacturers, and may include such geotextiles as Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026 and/or other filler materials as well as. For example, in some embodiments, an outrigger or outrigger fin may comprise an external material of geotextile fabric and an internal material of geotextile as well as more rigid structural materials for load bearing and transfer purposes, and some embodiments may include a second or third or further internal material such as another geotextile fabric as well as another geotextile. Still further combinations may also be used in embodiments.

During installation, soil, such as sand, polymer granules, etc., or another ITM may be placed between the outriggers, outrigger fins, or other features of leaching systems in embodiments. In preferred embodiments, the placement of the ITM should preferably provide minimal disturbance to the positioning of the outriggers and outrigger fins after a module or other component is positioned and the leaching chambers are positioned in their deployed position. In other words, the placement of the ITM around system components should be preferably accomplished with little movement to the system components.

Various supports may be employed to support the dosing conduits and the leaching chambers during installation and afterwards, during use. These supports may be placed at the ends of each module, along the length of the module, and/or at other positions as well. These supports may be permanent as well as removable. Permanent supports would remain with the infiltration field after the installation is complete, while removeable supports may be removed once the ITM is installed or the modules are otherwise supported during installation. Some embodiments may employ combinations of permanent and removeable supports.

In certain embodiments, a manifold may be placed at the bottom of the leaching modules. This manifold may be configured such that it provides for the redistribution of water between most or all of the rows of outriggers or outrigger fins. Certain bottom interconnecting manifold designs may also be employed. These bottom interconnecting embodiments, as well as other embodiments, may have an inspection port integrated into the manifold to monitor water levels or other operational or maintenance features of the leaching modules. Inspection ports can also be placed into hydraulic communication without integration into bottom interconnecting manifolds of embodiments. Also, inspection ports may be coupled to bottom manifold or formed as part of bottom manifold in embodiments. These ports, as well as others, may be used to monitor water, system status, carbon source efficacy, and/or other conditions. Carbon sources placed in the manifolds, other portions of the leaching modules, and/or other portions of an infiltration system may include methanol, methanol substitutes, microC, sugar, and/or other sources. Still further, the ports may be used for connection to other portions of a water processing system, including denitrification systems and additional modules.

In some applications, a wastewater or other water leaching system can be fluidly coupled with a treatment tank that can receive water, such as wastewater, allow for solids from the water to settle out, and/or remove Biological Oxygen Demand (BOD), Total Suspended Solids (TSS), nitrogen, Phosphorus, bacteria and/or pathogens, among other constituents.

Some embodiments may use gravity dosing of outrigger leaching fins, while some may employ pressure distribution and/or pressure dosing. Systems employing both gravity and pressurized distribution and/or dosing may also be employed in embodiments. In embodiments, pressure distribution systems can be outfitted with distal head monitoring ports, and these ports may also be utilized for cleaning the orifices. And, the rigid piping frame work can have a ladder configuration with the proximal and distal ends serving to provide a framework from which the leaching modules and internal piping can be supported.

Manifold risers may also be employed in embodiments. The top elevation of such risers can be configured with a saddle to hold a pipe and may be set at a desired position such that an installed module may be held at the correct installation elevation prior to the placement of ITM. In embodiments, a plurality of manifold risers or standoffs may be employed and may be used to determine and set module installed elevation. In so doing, the entire area beneath the system does not need to be accurately graded as normal, rather just the area of standoffs preferably should be set at invert grade for a proper elevation and pitch to be set during installation. In avoiding the need to accurately grade the entire area beneath the system during installation, improvements in the speed of excavation and grading may be realized. However, accurately grading the entire area beneath the system during installation may be performed in embodiments. The soil, such as sand, or other ITM may then be filled around the leaching modules to fill in areas that are too low in elevation and need ITM. Thus, manifold risers can have various heights in the same installation in order to accommodate the grading and installation excavation requirements of the site. By having different height manifold risers, the leaching modules can be levelled or placed at an incline using the standoffs and without necessarily having the grading mimic the final top slope or lack of slope of the support pipes or conduits and the leaching modules.

Figure 1B:
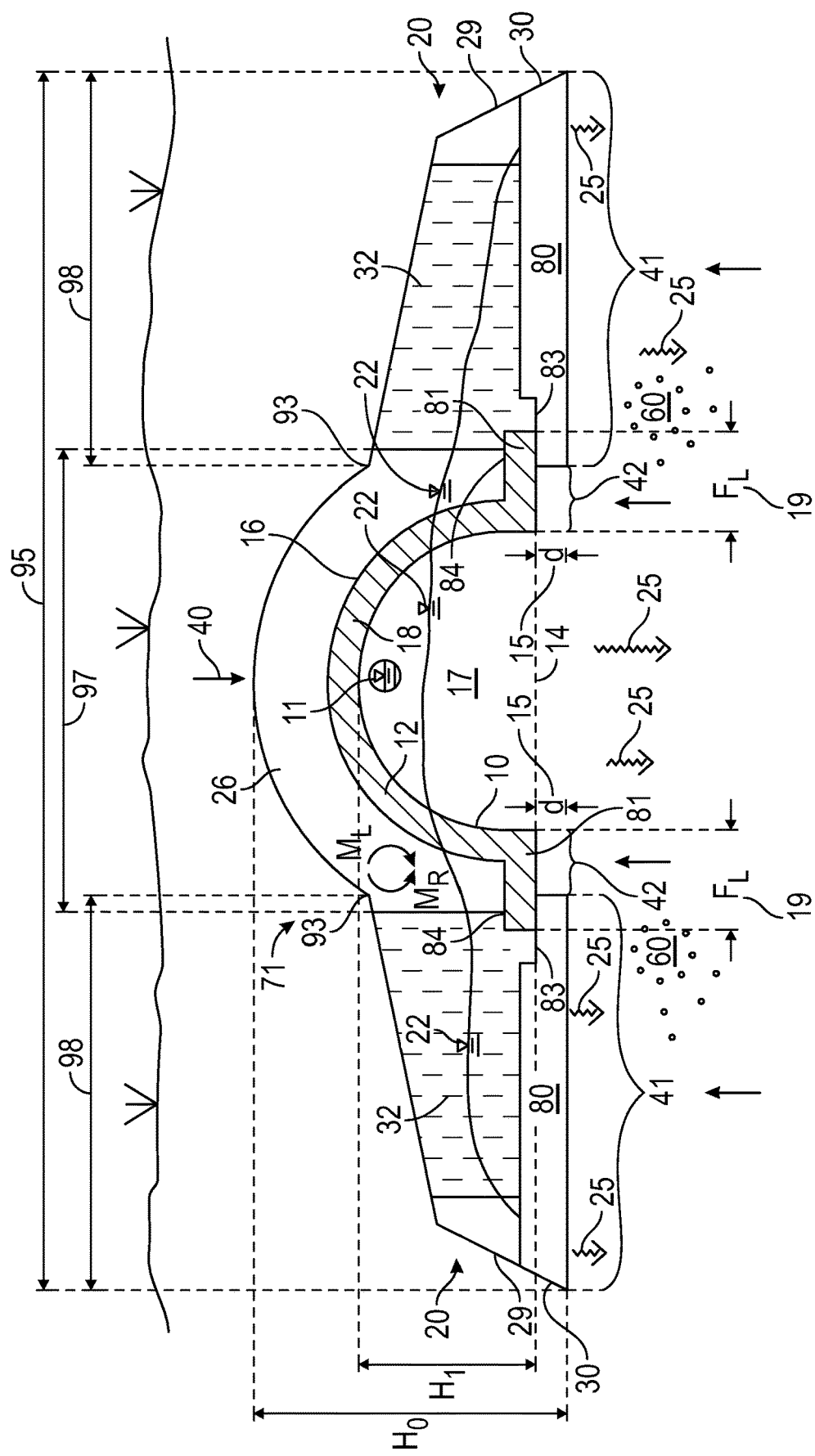
FIG. 1B shows a partial cross-sectional elevational view of a leaching module with integral outriggers as may be employed in embodiments.

FIG. 1A shows a partial cross-sectional front view of a leaching module 70 with non-integral outriggers as may be employed in embodiments. FIG. 1B shows a partial cross-sectional front view of a leaching module 71 with integral outriggers as may be employed in embodiments. Similar features share identical numerals in FIGS. 1A and 1B as well as with other figures identified and described herein. The leaching modules 70 and 71 comprise various features including the labelled receiving chamber 10 with wastewater or other water receiving area 17, upper arched portion 18, distribution pipe 11, chamber wall 12, chamber foundation 81, externally facing outward surface 16, open bottom leaching interface 14, and perimeter ledge 84. Other labelled features of FIGS. 1A and 1B include outrigger span 26, outrigger leaching fin infiltrative surfaces 32, outrigger leaching fins 20, outwardly facing edges 29, fin foundations 80, outwardly facing foundation edges 30, fin foundation perimeter edges 83, structural connections 93, and underlying treatment media 60. Also labelled in FIGS. 1A and 1B are water level 22, internal chamber height $H_1$, outrigger span height $H_O$, reactive forces applied over area 41, reactive forces applied over area 42, external normal load 40, wastewater or other water infiltration arrows 25, depth (d) 15 of perimeter ledge 83, chamber footer length $f_L$ 19, outrigger total length 95, receiving chamber with footings total width 97, outrigger fin length 98, load moment ML, and reactive moment $M_R$. A space 92 is present in FIG. 1A while it is not present in FIG. 1B because FIG. 1B shows an exemplary integral leaching module.

In embodiments, an outrigger, which may comprise a span 26 and one or more outrigger fins 20, may be mated to a receiving chamber 10. The outrigger may serve to provide reactive forces 41 in response to an external load that may be present above a leaching module 70 or 71 and to reduce or eliminate reactive forces 42. The configuration of the outrigger may be such that some or a all of an external load is carried by the outrigger rather than an associated receiving chamber 10. In embodiments, fin foundations 80 may be include perimeter ledges 83 and may be positioned so as to secure with a portion of a receiving chamber 10. In FIGS. 1A and 1B, the perimeter ledges 83 are below and support the receiving chamber foundations 81. The distance d15, shows how the fin foundations 80 may be below the receiving chamber foundations 81. The outrigger may be configured such that it can carry reactive moments $M_R$ large enough to withstand loading moments ML created between the outrigger span 26 and the outrigger fins 20. Under external normal loading, when an outrigger is properly positioned, the interior chamber height $H_1$ may have minimal or no deflection. The distance d15 shows how invert elevation locations may differ between a receiving chamber and the foundation of an outrigger. This invert elevation difference may allow for a larger proportion of reactive loads to be carried by the outrigger than if both the outrigger foundation and the foundation of the receiving chamber(s) were at the same elevation.

As shown in FIGS. 1A, 1B, the outriggers may serve as infiltration channels as well. Wastewater or other water may enter the leaching module 70 or 71 via distribution pipe 11 and may percolate down through leaching interface 14 as well as through outrigger leaching fin infiltrative surfaces 32. A water level 22 is shown. This water level may reflect a level during a wastewater dosing cycle where wastewater or other water has been received via the distribution pipe and is temporarily held by the leaching module until it may infiltrate through any infiltrative surfaces of the receiving chamber and the outriggers. The infiltrative surfaces may comprise various materials, including the infiltrative materials described herein. The outrigger leaching fins as well as the outriggers themselves may have various shapes besides the circular span with sloping top outrigger fins shown in FIGS. 1A and 1B. Examples of fin permutations are described and shown below. Fluid communication between the outrigger fins and receiving chambers of FIGS. 1A, 1B, and 2 as well as in other embodiments, may be accomplished in various ways. These ways may include open voids, infiltrative surfaces, other openings or penetrable interfaces in which water may flow through, or combination(s) thereof. Thus, for example, in FIGS. 1A, 1B, and 2 the span 26 may be hollow with an infiltrative surface along its bottom surface in which water may leave the receiving chamber and enter the outrigger fins. The span and the outrigger fins may each also contain a geonet fabric or other material within portions of them as well as within a majority or all of them.

The moments created by the loading and the reactive loading moments may be created by active loads or active and overburden loads. These loads may be upwards of approximately 13.8 psi or less or more. The overburden loads may be upwards of approximately 5.0 psi or more and may be created by the weight of the overburden above a buried leaching chamber and outrigger system. In embodiments, the outrigger(s) may be sized and configured to carry reactive moment(s) created by approximately 18.8 psi of normal loading on the leaching chamber without being plastically deformed, in other words, without structurally failing.

Figure 2:
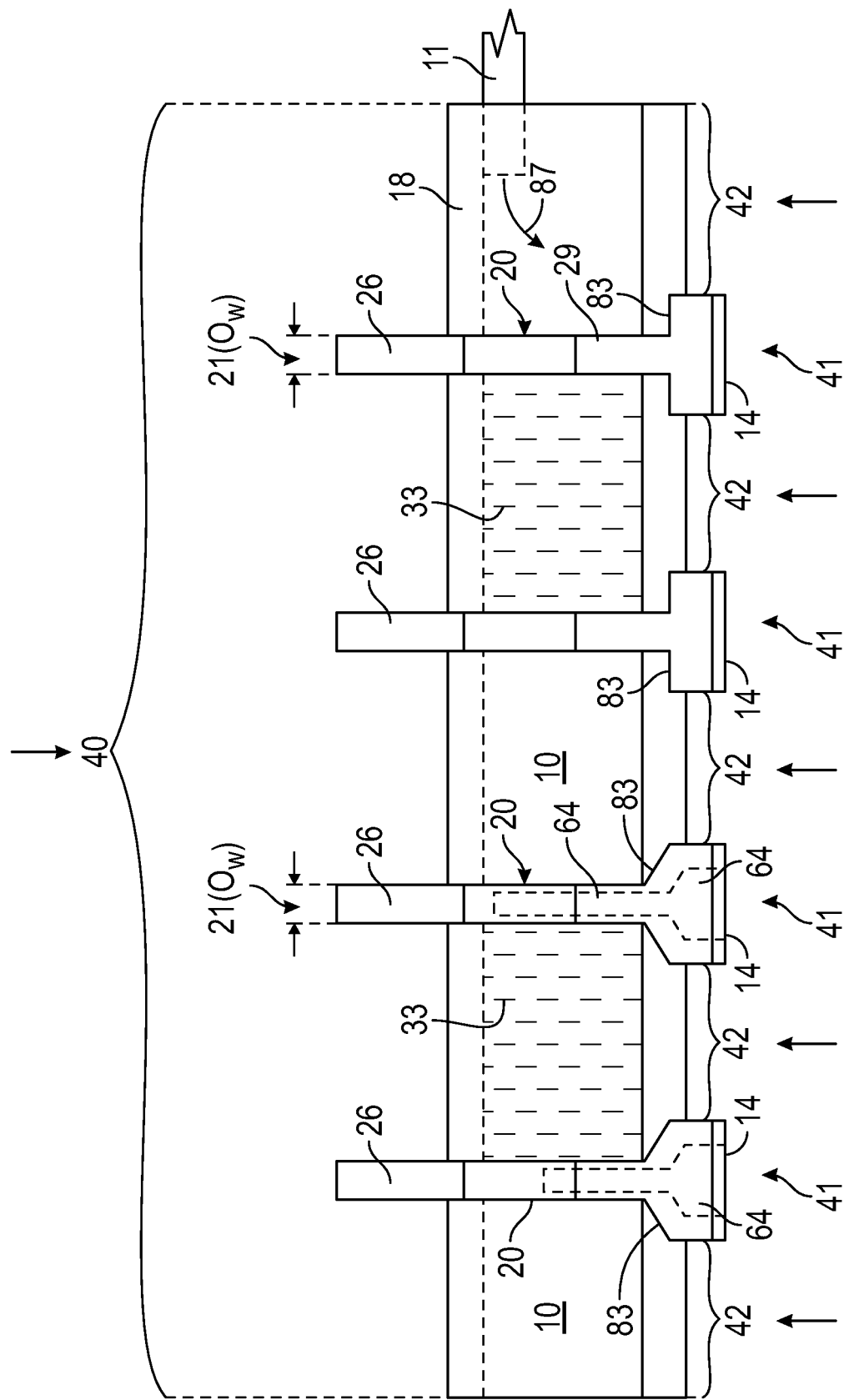
FIG. 2 shows a side elevational view of the leaching module with outriggers of FIG. 1A or FIG. 1B as may be employed in embodiments.

FIG. 2 shows a side elevational view of the leaching module with outriggers of FIG. 1A or FIG. 1B as may be employed in embodiments. FIG. 2 is labelled with external load applied over area 40, outrigger width ($O_w$) 21, outrigger spans 26, outrigger upper arched portions 18, distribution pipe 11, wastewater or other water inflow 87, outrigger outwardly facing edges 29, outrigger leaching fins 20, perimeter ledges 83, outrigger interiors 64, infiltrative surface bottoms 14, receiving chambers 10, side infiltrative surfaces 33, reactive forces applied over area 42, and reactive forces applied over area 41. Other infiltrative surfaces may also be located on edges and sides of the outriggers as well as the receiving chambers. For example, while two of the side surfaces of the receiving chamber 10 are shown with infiltrative surfaces 33, three, four, or all of the side surfaces shown in FIG. 2 may also have full or partial infiltrative surfaces in addition to or instead of the two side infiltrative surfaces 33 shown. In embodiments, the outrigger interior may contain a void or a series of voids and may also be filled with a geomat, geotextile, or other damping material. This geomat, geotextile, or other damping material may serve to slow wastewater or other water flow down when it is moving within an outrigger. The fins and spans as well as remaining portions of outriggers may have solid portions or be completely solid as well. The solid portions may be located in areas of high structural loading such as in the span 26, while areas of the outrigger positioned to receive lesser loading forces may be reinforced but also contain areas in which wastewater or other water may move and be discharged through. In some embodiments, the thickness of the outrigger may increase in thickness around one or more of the slots 33. Thus, average thickness of an outrigger, e.g., its fin or fins, or other portions may be approximately 0.125 inches while around the slots themselves the thickness may be approximately 0.375 inches or other thickness that may be larger than other areas of material comprising the fins or other portions of the outriggers.

As can be seen in FIG. 2 and elsewhere, when in use, embodiments may be placed under external loads 40 from above, and these loads may be opposed by reactive forces 42 exerted through the receiving chamber 10 and by reactive forces 41 exerted through the outriggers. In preferred embodiments, treatment media or other material below the outriggers and the receiving chamber may be compacted and level so as to provide a uniform base of support for the receiving chamber 10 and outriggers. In embodiments, the cumulative reactive forces 41 may be larger than then cumulative reactive forces 42. This concentration of reactive forces through the outriggers can serve to reduce the deflection or other distortion of the receiving chamber 10. In embodiments, such as when a separation 92 (shown in FIG. 1A) is present between the receiving chamber 10 and the span 26, little or no external load 40 may be transferred to the receiving chamber 10.

Figure 3C:
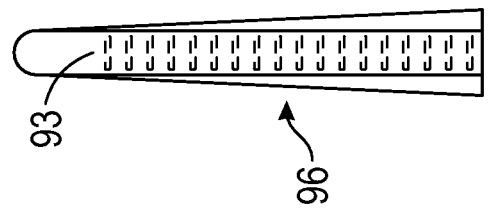
FIG. 3C shows a side view of the leaching module outrigger of FIG. 3A along line 3C-3C as may be employed in embodiments.
Figure 3A:
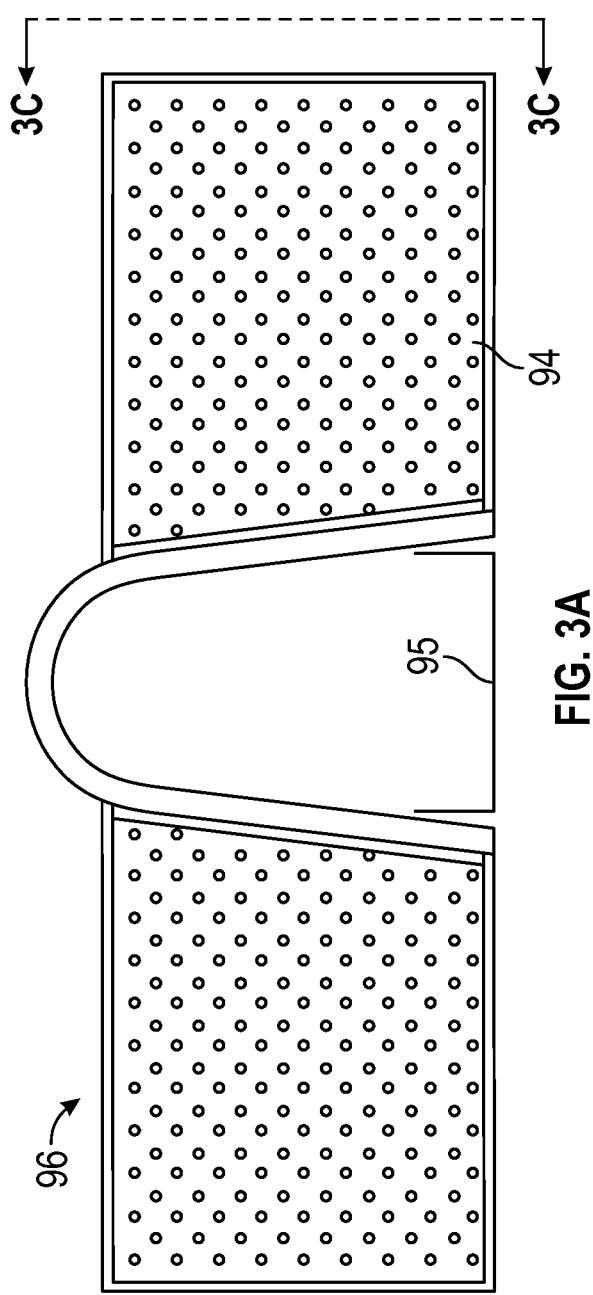
FIG. 3A shows an elevational view of a leaching module outrigger as may be employed in embodiments.
Figure 3B:
FIG. 3B shows a top view of the leaching module outrigger of FIG. 3A as may be employed in embodiments.

FIG. 3A shows a front view of a leaching module outrigger 96 as may be employed in embodiments. FIG. 3B shows a top view of the leaching module outrigger 96 of FIG. 3A as may be employed in embodiments. FIG. 3C shows a side view of the leaching module outrigger 96 of FIG. 3A as may be employed in embodiments. The treatment media buffer 95, pins 94, which may support a covering fabric, and slots 93, which may also be covered with filtering fabric, or uncovered in embodiments, are also labelled in at least one of these three figures.

Figure 4:
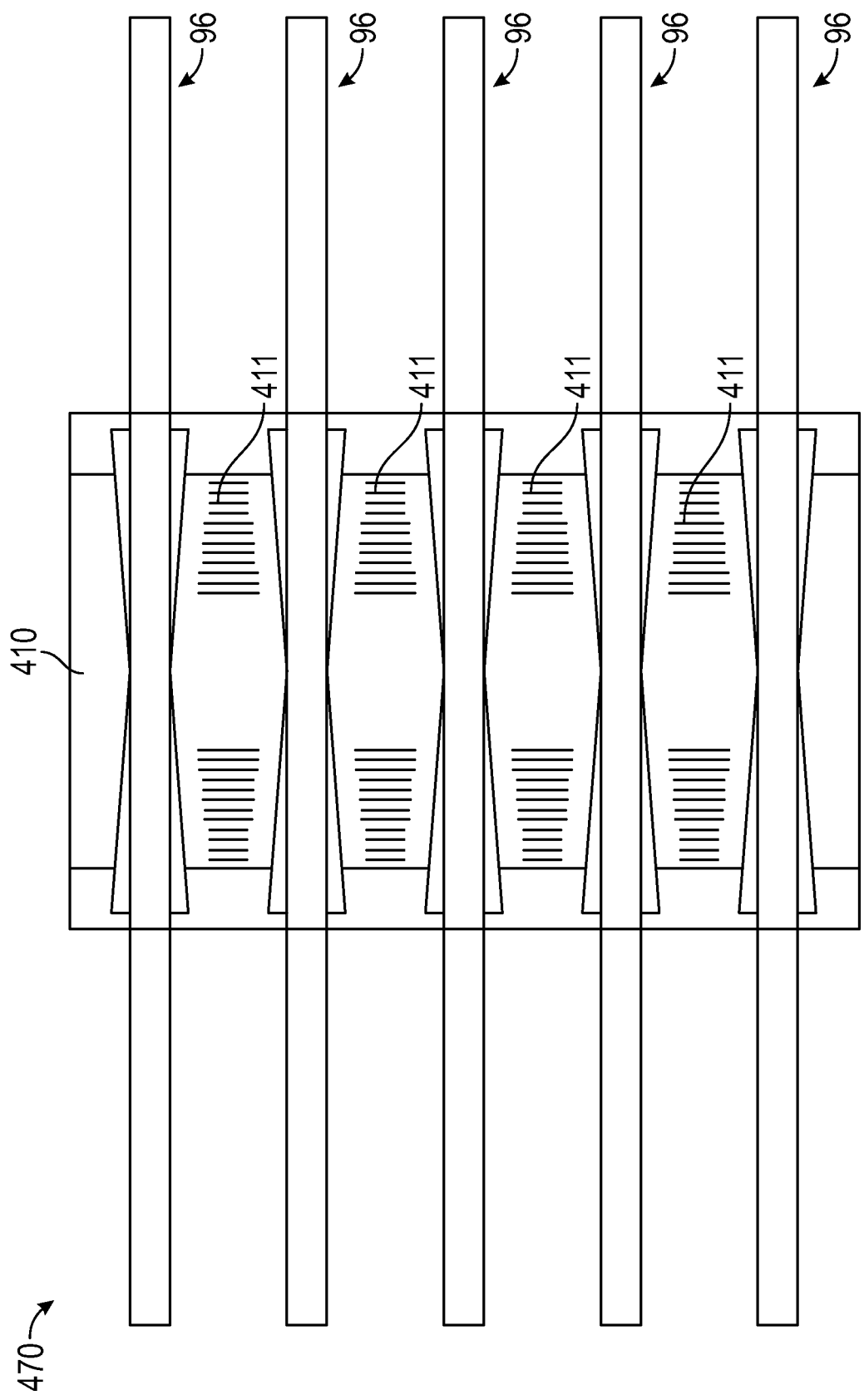
FIG. 4 shows a top view of a leaching module with outriggers as may be employed in embodiments.

FIG. 4 shows a top view of a leaching module with outriggers as may be employed in embodiments. Labelled in FIG. 4 are leaching module 470, receiving chamber 410, infiltration slots 411, which are present along the sides of the receiving chamber 410, and leaching module outriggers 96.

Figure 5:
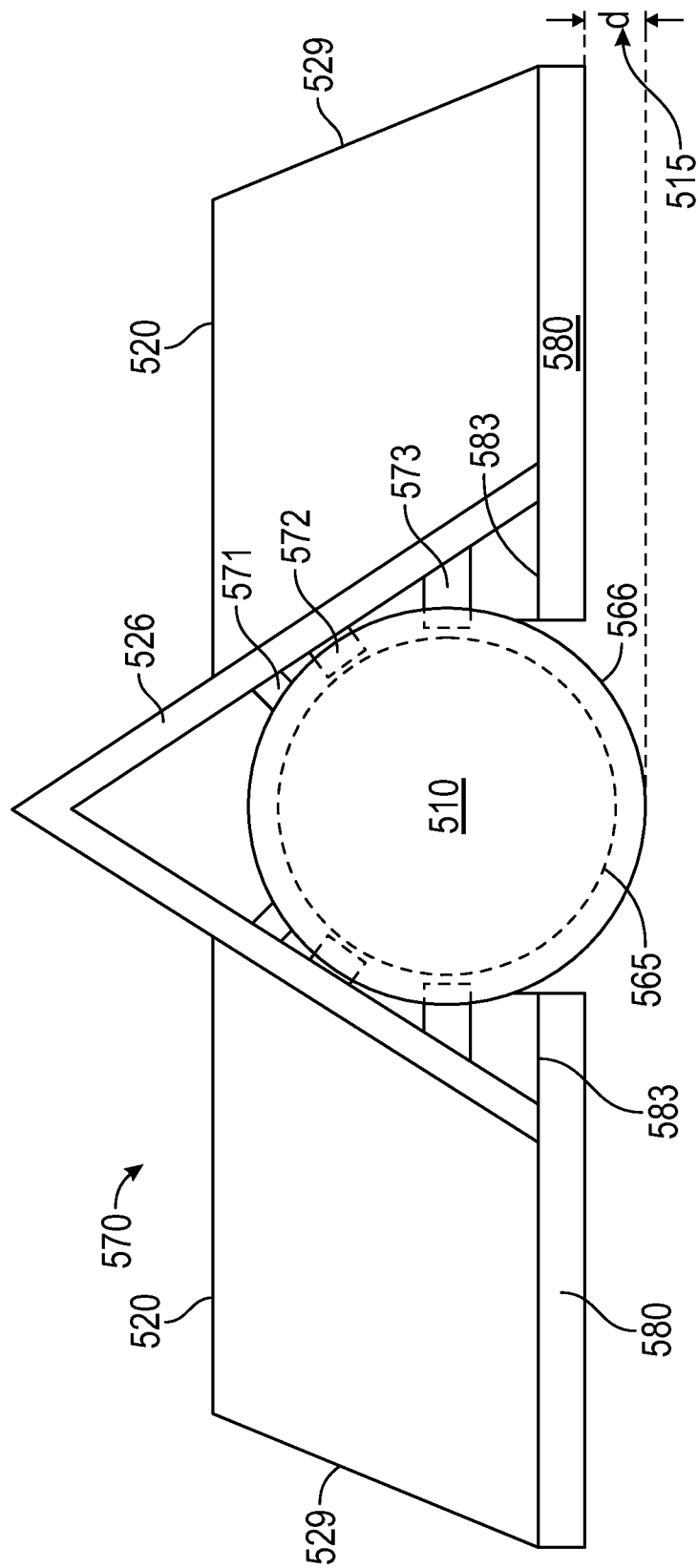
FIG. 5 shows an end elevational view of a leaching module with outriggers as may be employed in embodiments.

FIG. 5 shows a front view of a leaching module 570 with outriggers as may be employed in embodiments. In FIG. 5 the leaching module 570 with outriggers, the outrigger span 526, the outrigger fins 520, the receiving chamber 510, which, in FIG. 5, is a corrugated pipe having an inner corrugation 565 and an outer corrugation 566, but may be other materials, tabs 571-573, perimeter ledge 583, outwardly facing edge 529, fin foundation 580 and distance d 515 are all labelled. In some embodiments, the receiving chamber may be a corrugated pipe as is shown in FIG. 5. In such instances, tabs 571-573 may serve to hold the corrugated pipe or other receiving chamber in place relative to the outrigger fins 520 and relative to the outrigger span 526. As can be seen in FIG. 5, the receiving chamber may sit below the fin foundation 580 a distance d 515. In these instances, as well as in others, the outrigger span or other portions of the outrigger may be configured to transfer loads away from the receiving chamber and to the outrigger fins and their foundation. In FIG. 5, the pointed nature of the span may serve to reduce normal loads atop the receiving chamber and to deflect these normal loads away from the receiving chamber 510. The tabs may allow for rotation of the receiving chamber or may be configured to mate with the receiving chamber and to retard or prevent rotation or other movement of the receiving chamber.

FIG. 6 shows a partial front view of a leaching module with outriggers 670 as may be employed in embodiments. Here, the receiving chamber 610 is engulfed by the leaching fin surface 620 and also includes a spacing 614 below the receiving chamber. This spacing 614 may shrink as loads are applied to the outriggers 670. Comparatively, in FIG. 7, which shows a partial front view of a leaching module with outriggers 770, two receiving chambers 710 may be positioned within the outriggers but the spacing 714 between the outrigger leaching fin surfaces 720 may be larger. This space 714 between outrigger leaching fin surfaces 720 may allow for greater infiltration from the receiving chambers than from the smaller space 614 between outrigger leaching fin surfaces 620 depicted in FIG. 6. Treatment media 60 is also labelled in both FIGS. 6 and 7.

FIGS. 8A-8C show partial sectional views of a leaching module with outriggers as may be employed in embodiments. Outrigger sections 870, tabs 871, 872, receiving chamber wall 810, perimeter ledges 883, chamber foundations 811, chamber tab receptacles 874, treatment media 60, and footing anchor 812 are also labelled in one or more of these Figures. As can be seen, various configurations of the interface between an outrigger and a receiving chamber may be employed in embodiments. These interface details may serve to retard lateral movement, up or down movement, other directions and types of movement or combinations thereof.

Figure 9:
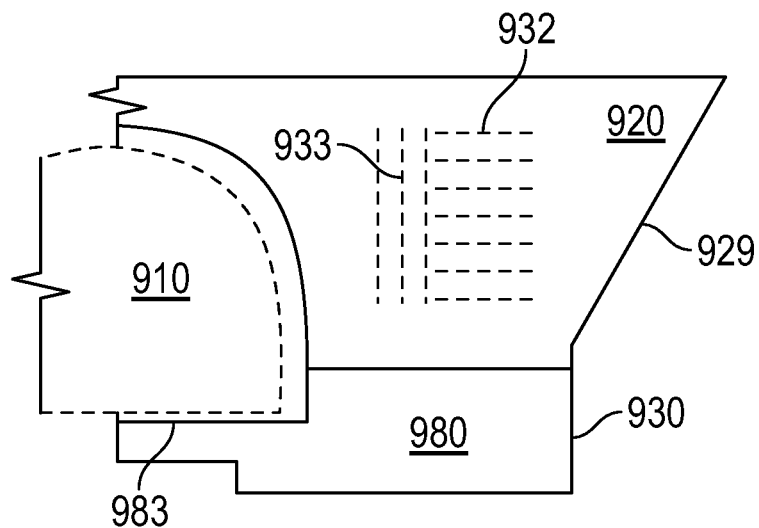
FIG. 9 shows a partial end elevational view of a leaching module with outrigger as may be employed in embodiments.
Figure 10A:
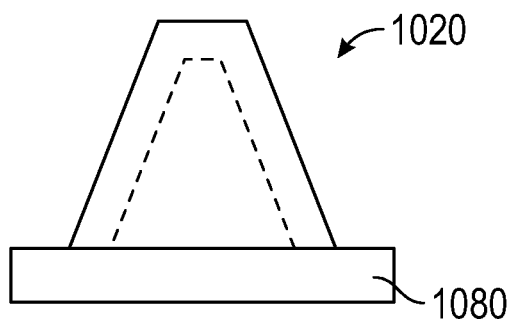
FIG. 10A shows a side view of a leaching module outrigger as may be employed in embodiments.
Figure 10B:
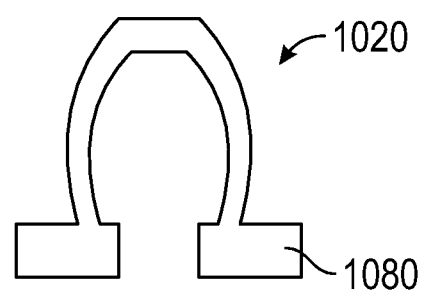
FIG. 10B shows a side view of a leaching module outrigger as may be employed in embodiments.
Figure 10C:
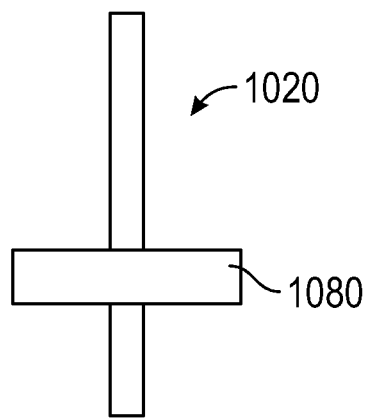
FIG. 10C shows a side view of a leaching module outrigger as may be employed in embodiments.
Figure 10D:
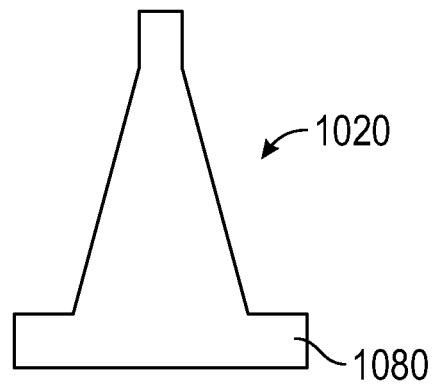
FIG. 10D shows a side view of a leaching module outrigger as may be employed in embodiments.

FIG. 9 shows a partial front view of a leaching module with outrigger as may be employed in embodiments. Outrigger fin 920, infiltrative surface 932, infiltrative surface 933, inwardly sloping edge 929, outwardly facing edge 930, outrigger stepped fin foundation 980, perimeter ledge 983, and receiving chamber 910 are labelled in FIG. 9. FIG. 9 shows, among other things, that infiltrative surfaces 932 and 933 may have various orientations and may occupy a portion of a surface of an outrigger fin 920 surface or other surface(s) in embodiments. Also visible in FIG. 9 are the inwardly sloping edge 929 and the outrigger stepped fin foundation 980, each of which may be employed in embodiments.

FIGS. 10A-10D show side views of a leaching module outrigger fin as may be employed in embodiments. As can be seen, various cross sections may be employed by outrigger fins 1020 and foundations 1080 of embodiments. These configurations can include trapezoidal bodies as in FIGS. 10A and 10D, crossing rectangles as in FIG. 10C, and horseshoe shapes as in FIG. 10B.

Figure 11A:
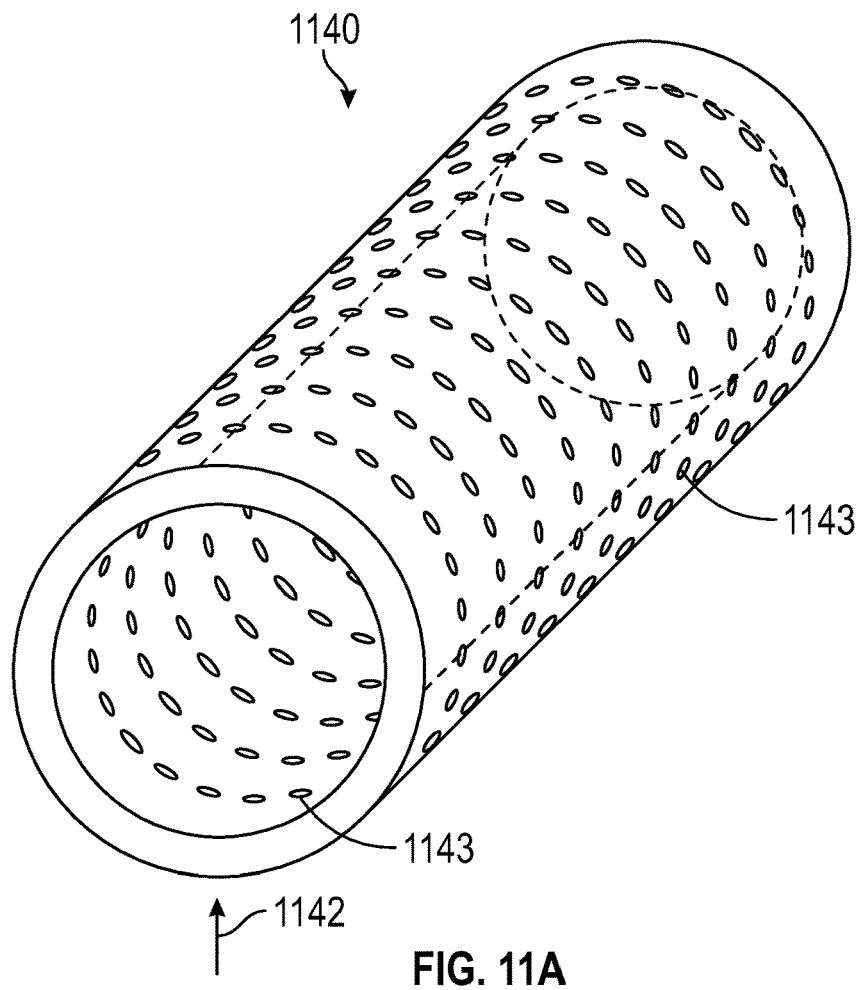
FIG. 11A shows a perspective view of a leaching module receiving chamber as may be employed in embodiments.
Figure 11B:
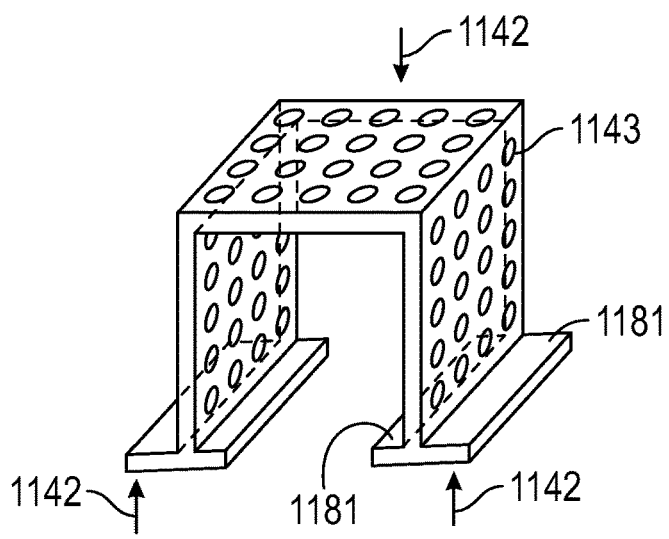
FIG. 11B shows a perspective view of a leaching module receiving chamber as may be employed in embodiments.

FIGS. 11A and 11B show perspective views of leaching module receiving chambers as may be employed in embodiments. As can be seen, various configurations of the receiving chambers may be employed. In FIG. 11A, for example, the receiving chamber is shown in the shape of a cylinder having a closed bottom, while the receiving chamber of FIG. 11B is shown as an open bottom rectangular box having foundations extending from both sides of its walls. Perforations 1143, normal loads 1140, and reactive loads 1142 are also labelled in FIGS. 11A-11B. Receiving chamber perimeter ledge 1181 is also labelled in FIG. 11B.

Figure 12A:
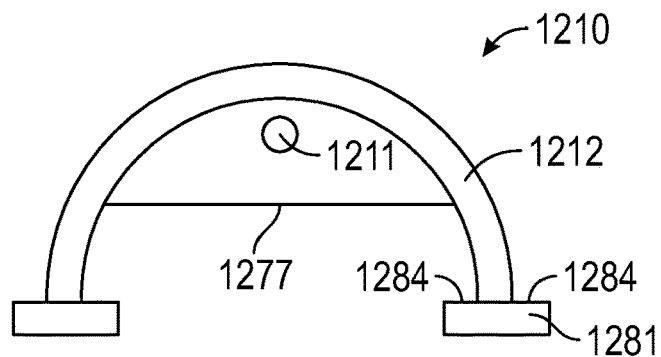
FIG. 12A shows a sectional elevation view along line 12A-12A of FIG. 12B of a leaching module receiving chamber as may be employed in embodiments.
Figure 12B:
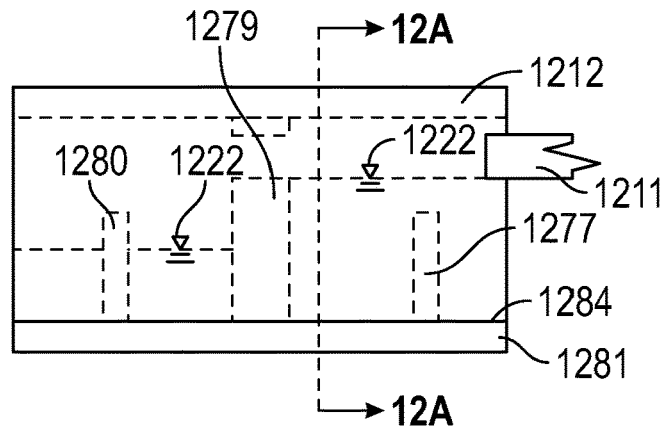
FIG. 12B shows a side elevational view of a leaching module receiving chamber as may be employed in embodiments.

FIG. 12A shows a sectional view of a leaching module receiving chamber along line 12A-12A of FIG. 12B as may be employed in embodiments. Labelled in one or both of these figures are receiving chamber 1210, chamber wall 1212, baffle 1277, baffle 1279, and baffle 1280, chamber foundation 1281, foundation ledge 1284, water level 1222, and distribution pipe 1211. As can be seen, receiving chambers of embodiments may have internal features, such as baffles or other structures. These internal features may serve to control or manage water flow within the receiving chamber or to outside of the receiving chamber.

Figure 13:
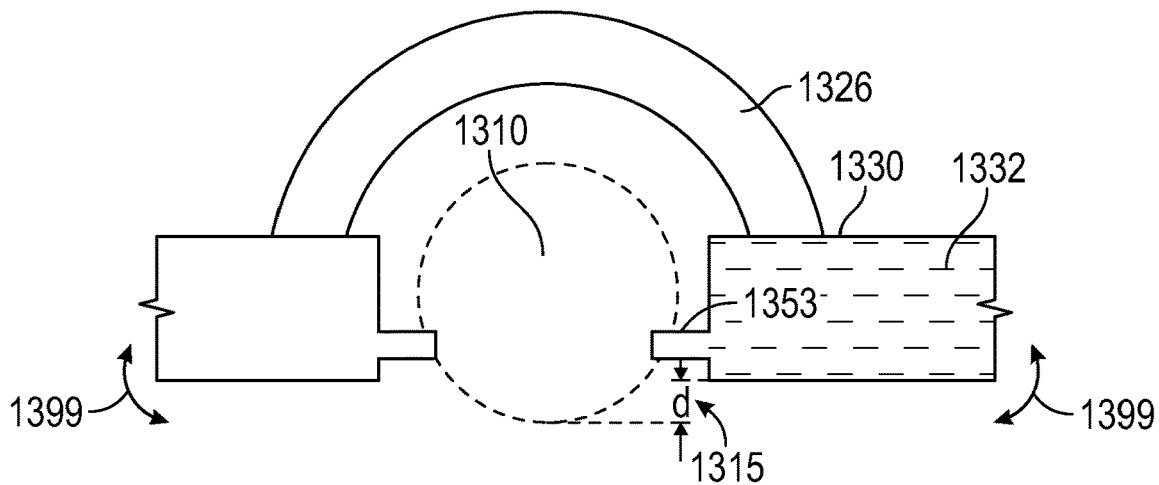
FIG. 13 shows an end view of portions of a leaching module and detachable receiving chamber as may be employed in embodiments.

FIG. 13 shows a front view of portions of a leaching module and detachable receiving chamber as may be employed in embodiments. Reactive moments 1399 show how the outrigger fins 1330 may be under torque forces when supporting overburdens or other imposed external loads. The receiving chamber 1310, outrigger span 1326, infiltrative surface 1332, chamber foundation surface 1353, and distance (d) 1315 between the outrigger fin foundation and the bottom of the receiving chamber 1310 are all labelled in FIG. 13.

Figure 14:
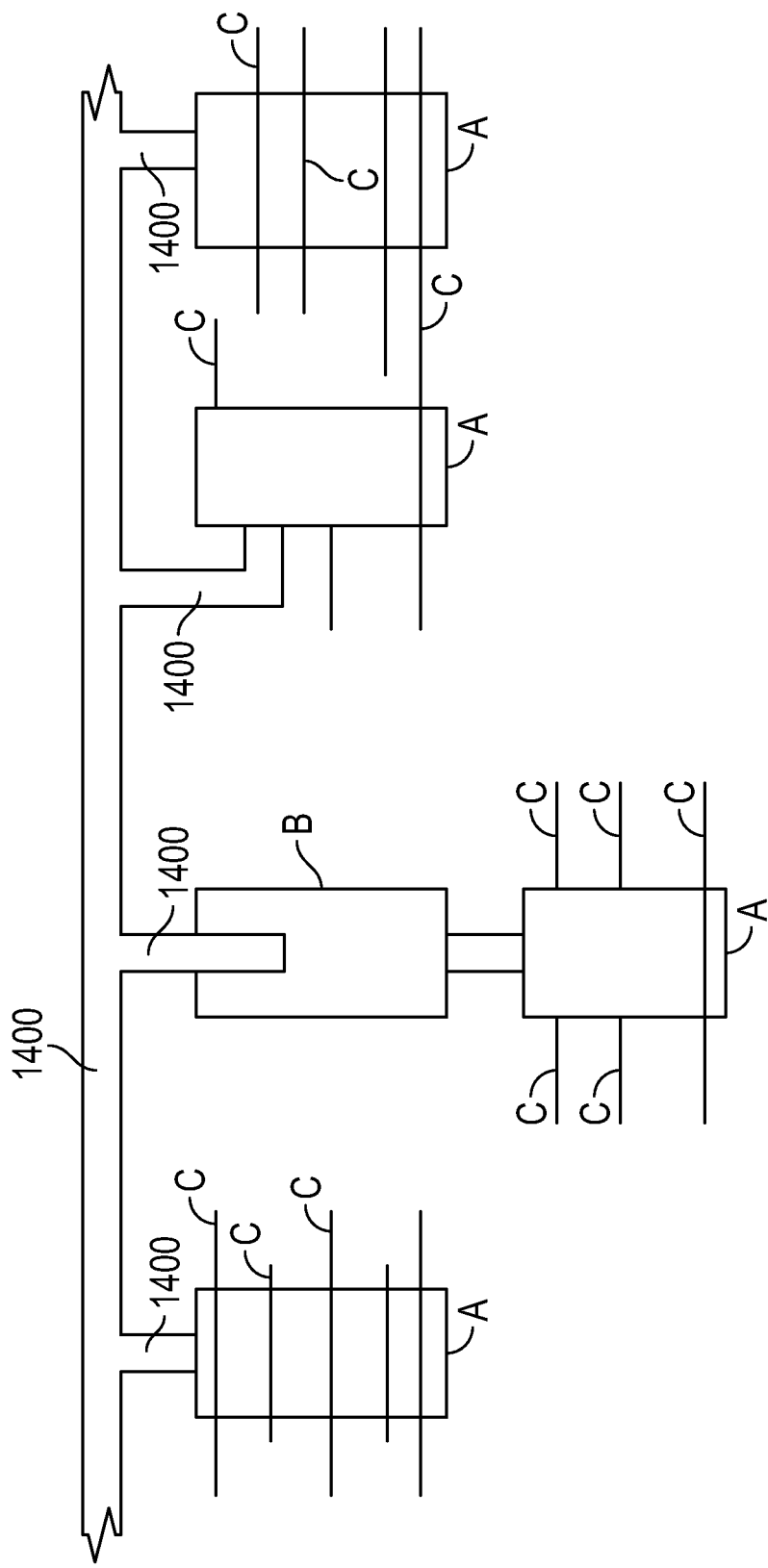
FIG. 14 shows a wastewater or other water leaching system schematic, including leaching modules with outriggers and without outriggers, as may be employed in embodiments.

FIG. 14 shows a wastewater or other water leaching system schematic, including leaching modules with outriggers (A) and without outriggers (B), as may be employed in embodiments. Each of the various permutations described herein as well as variations consistent with their teachings may be employed in one or more leaching systems. The five leaching modules (A+B) shown in FIG. 14 may be of the same type and of different types of the leaching modules disclosed and described above. Likewise, the outriggers and outrigger fins may be of the various types disclosed above in the same leaching system. The distribution piping 1400 may fluidly connect to some of the leaching modules while other leaching modules may be fluidly connected in series from another leaching module via a receiving chamber, piping, and/or via outrigger fins, etc. As can also be seen in FIG. 14, the outrigger fins (C) may have similar or different lengths and may lie along the same reference line when in pairs or along different reference lines when in pairs. Some outrigger fins may also be staggered in embodiments.

In use, the leaching module may be installed in an excavation and supported at each end with temporary or permanent supports and may be backfilled from above or otherwise, such that the backfill treatment media interfaces with upright outer surfaces of geotextile wraps hanging down off of the distribution conduits. Once backfilled, the leaching module may be covered with additional geotextile, soil: such as sand, polymer granules, etc., or another ITM, a plastic impermeable cover, grass, pavers, and other materials as well. For oxygenation or other purposes, the module may be approximately six inches or more below finished grade, although other depths may be employed in embodiments.

The water processing system can include small-scale applications that may employ a treatment system that can often include a treatment tank which can include a septic tank, settlement or other treatment tank, or other tank; these tanks can receive water, allow for solids and/or sediment from the water to settle out, and remove Biological Oxygen Demand (BOD), Total Suspended Solids (TSS), nitrogen, Phosphorus, bacteria, and/or pathogens, among other constituents. The water processing system can include an infiltration system comprising a leaching field with leaching modules as described herein. These tanks and fields can operate to treat the water and discharge the water back to the environment for further treatment and groundwater recharge. The leaching fields and leaching modules, when in operation, can serve to nitrify water and subsequent to nitrifying water, treat or partially treat it. At the same time or during subsequent steps, carbon sources may serve to denitrify the water being processed.

Inner and outer materials of the outrigger fins may comprise geotextiles obtained from various manufacturers, and may include such geotextiles as Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026. In embodiments, outrigger fins may be configured with slots to permit water flow or other infiltrative flow to and from one or more geotextiles. Also, any or all of the above geotextiles as well as other geotextiles may be used in conjunction with each other in embodiments. Still further, inner and outer materials of the leaching outrigger fins may also comprise one or more geotextile comprising an irregularly coiled stringy structure contained between one or two layers of air-permeable sheeting, which layers may feel to the touch like thin felt. In embodiments, the geotextile may have only one layer and one side of that layer may have an irregularly coiled string plastic structure. In some leaching outrigger fin embodiments, no inner materials may be used, and in still other embodiments the inner material may only occupy a portion of the leaching channel. For example, the inner material may be present below the distribution conduit but not wrap around the distribution conduit. Still further embodiments may only employ an inner material present between upper and lower conduits that does not wrap around either upper or lower conduits. In addition, a flat pipe or other inner material may be positioned below an upper conduit or between both conduits and the outer material and then may wrap around this combination of materials.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

It should be noted that the terms "first", "second", and "third", and the like may be used herein to modify elements performing similar and/or analogous functions. These modifiers do not imply a spatial, sequential, or hierarchical order to the modified elements unless specifically stated.

As used herein, the terms "about" or "approximately" in reference to a recited numeric value, including for example, whole numbers, fractions, and/or percentages, generally indicates that the recited numeric value encompasses a range of numerical values (e.g., +/−5% to 10% of the recited value) that one of ordinary skill in the art would consider equivalent to the recited value (e.g., performing substantially the same function, acting in substantially the same way, and/or having substantially the same result). As used herein, the terms "about" or "approximately" in reference to a recited non-numeric parameter generally indicates that the recited non-numeric parameter encompasses a range of parameters that one of ordinary skill in the art would consider equivalent to the recited parameter (e.g., performing substantially the same function, acting in substantially the same way, and/or having substantially the same result).

Recitation of ranges of values herein are merely intended to serve as a shorthand method of referring individually to each separate value falling within the range, unless otherwise indicated herein, and each separate value is incorporated into the specification as if it were individually recited herein.

Language such as "configured to" and "facilitate" connotes structure by indicating that a device, such as a unit or a component, includes structure that performs a task or tasks during operation, and such, structure is configured to perform the task even when the device is not currently operational (e.g., is not on/active). A device "configured to" perform or "facilitate" one or more tasks is expressly intended to not invoke 35 U.S.C. § 112, (f) or sixth paragraph.

The description of the embodiments of the present invention has been presented for purposes of illustration and description but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A water leaching system comprising:
   a polymer receiving chamber with a length, an upper arched portion, a lower portion, a water receiving area aligned along the length, an internal height, and an outer wall having an externally facing outer surface; and
   a plurality of outriggers,
      wherein at least a majority of the outriggers of the plurality extend a distance away from the externally facing outer surface, the distance equal to or greater than one-half the internal height of the polymer receiving chamber,
      wherein at least a majority of the outriggers of the plurality are in fluid communication with the water receiving area,
      wherein at least a majority of the outriggers are configured to receive water that has flowed within the polymer receiving chamber and along the length of the polymer receiving chamber,
      wherein at least a majority of the outriggers of the plurality have at least one infiltrative surface, the infiltrative surface configured to infiltrate water within the outrigger to a treatment media located outside of the outrigger, and
      wherein the polymer receiving chamber has a weight and the plurality of outriggers have a cumulative weight and the polymer receiving chamber weight is not greater than four times the cumulative weight of the outriggers.

2. The water treatment system of claim 1 wherein the polymer receiving chamber comprises a circular pipe.

3. The water treatment system of claim 1
   wherein the polymer receiving chamber comprises a corrugated circular pipe, and
   wherein the polymer receiving chamber has a weight and the plurality of outriggers have a cumulative weight and neither the polymer receiving chamber weight nor the cumulative weight is greater than four times the other.

4. The water treatment system of claim 1 wherein each of the outriggers of the plurality of outriggers is fluidly connected to the polymer receiving chamber.

5. The water treatment system of claim 1 wherein pairs of the outriggers of the plurality of outriggers span over the upper arched portion of the polymer receiving chamber and extend outwardly from the polymer receiving chamber in different directions.

6. The water treatment system of claim 1 wherein the lower portion of the polymer receiving chamber has a leaching interface.

7. The water treatment system of claim 6 wherein the leaching interface is an open bottom.

8. The water treatment system of claim 1 wherein a majority of the outriggers of the plurality of outriggers each has an open bottom.

9. A wastewater leaching system comprising:
   a polymer receiving chamber having an outer wall, a chamber foundation surface, an external height, a length, and an internal wastewater receiving area aligned longitudinally along the length; and
   a plurality of outrigger leaching fins, each of the outrigger leaching fins having an infiltrative surface, each of the outrigger leaching fins having a fin foundation surface, each of the outrigger leaching fins extending from the outer wall of the receiving chamber a distance at least half of the external height of the polymer receiving chamber, each of the outrigger fins fluidly connected to the internal wastewater receiving area, and each of the outrigger fins connected to the polymer receiving chamber via a structural connection, the structural connection configured to transfer a moment developed in the structural connection without structural failure of the connection when a live load placed above the receiving chamber is at least 13.8 pounds per square inch.

10. The wastewater leaching system of claim 9 wherein a majority of outrigger leaching fins of the plurality of pairs of outrigger leaching fins have a closed or partially closed bottom surface and wherein each of the outrigger leaching fins has a height to width aspect ratio of three or more and ninety-six or less.

11. The wastewater leaching system of claim 9 wherein each of the outrigger leaching fins of the plurality of outrigger leaching fins is attached to the polymer receiving chamber via a tab coupled to the chamber foundation surface and wherein the polymer receiving chamber comprises a polymer pipe.

12. The wastewater leaching system of claim 9 wherein the fin foundation surface of each of the outrigger leaching fins has an outwardly facing edge.

13. The wastewater leaching system of claim 9 wherein each of the outrigger leaching fins further comprises a bottom infiltrative surface and wherein at least one of the polymer receiving chamber foundation surface and the fin foundation surfaces has a perimeter ledge.

14. A wastewater leaching system comprising:
- a plurality of pairs of outrigger fins, each outrigger fin comprising an external foundation and an infiltrative surface;
- a receiving chamber in fluid communication with each outrigger fin, the receiving chamber having an external foundation, and a first internal height, and a hollow, the hollow extending along an internal length of the receiving chamber,
- wherein a first outrigger fin of a first pair of outrigger fins extends outwardly past the receiving chamber in a first direction and a second outrigger fin of the first pair of outrigger fins extends outwardly from the receiving chamber in a second direction, the second direction opposite the first direction,
- wherein a first outrigger fin of a second pair of outrigger fins extends outwardly from the receiving chamber in a first direction and a second outrigger fin of the second pair of outrigger fins extends outwardly from the receiving chamber in a second direction, the second direction opposite the first direction, and
- wherein the first pair of outrigger fins and the second pair of outrigger fins are structurally connected to the receiving channel, the structural connection configured to transfer a portion of the weight of the receiving chamber to the pairs of outrigger fins for that transferred weight to be carried by the pair of outrigger fins.

15. The wastewater leaching system of claim 14 wherein one or more pairs of the plurality of pairs of the outrigger fins is configured to provide supporting reactive forces opposing normal compressive forces received by the receiving chamber.

16. The wastewater leaching system of claim 14 wherein the plurality of pairs of outrigger fins carries a portion of a normal load acting on the receiving chamber.

17. The wastewater leaching system of claim 14 wherein the receiving chamber comprises perforations, and wherein an external height of at least one outrigger fin of the plurality of pairs of outrigger fins is higher than any perforation on the receiving chamber.

18. The wastewater leaching system of claim 14 wherein a majority of the outrigger fins of the plurality of pairs of outrigger fins extends beyond the external foundation of the receiving chamber.

19. The wastewater leaching system of claim 14 wherein the outrigger fins and receiving chamber comprise the same material.

20. The wastewater leaching system of claim 14 wherein the outrigger fins and receiving chamber comprise concrete.

21. The wastewater leaching system of claim 14 wherein the outrigger fins and receiving chamber comprise injection molded material.

22. A water leaching system comprising:
- a polymer receiving chamber having an outer wall, a chamber foundation surface, an external height, a length, and an internal water receiving area aligned longitudinally along the length; and
- a plurality of outrigger leaching fins, each of the outrigger leaching fins having a height to width aspect ratio of three or more and ninety-six or less, each of the outrigger leaching fins having an infiltrative surface, each of the outrigger leaching fins having a fin foundation surface, each of the outrigger leaching fins extending past the outer wall of the polymer receiving chamber a distance at least approximately half of the external height of the polymer receiving chamber, each of the outrigger fins fluidly connected to the internal water receiving area, and each of the outrigger fins connected to the polymer receiving chamber via a structural connection, the structural connection configured to transfer a moment from the polymer receiving chamber to the leaching fins, wherein the transferred moment is carried by the receiving leaching fins,
- wherein at least one of the polymer receiving chamber foundation surface and the fin foundation surfaces has a perimeter ledge.

* * * * *